May 22, 1934. F. J. BAST ET AL 1,959,336
AUTOMATIC CYCLE CONTROLLER
Filed July 1, 1929 13 Sheets-Sheet 4
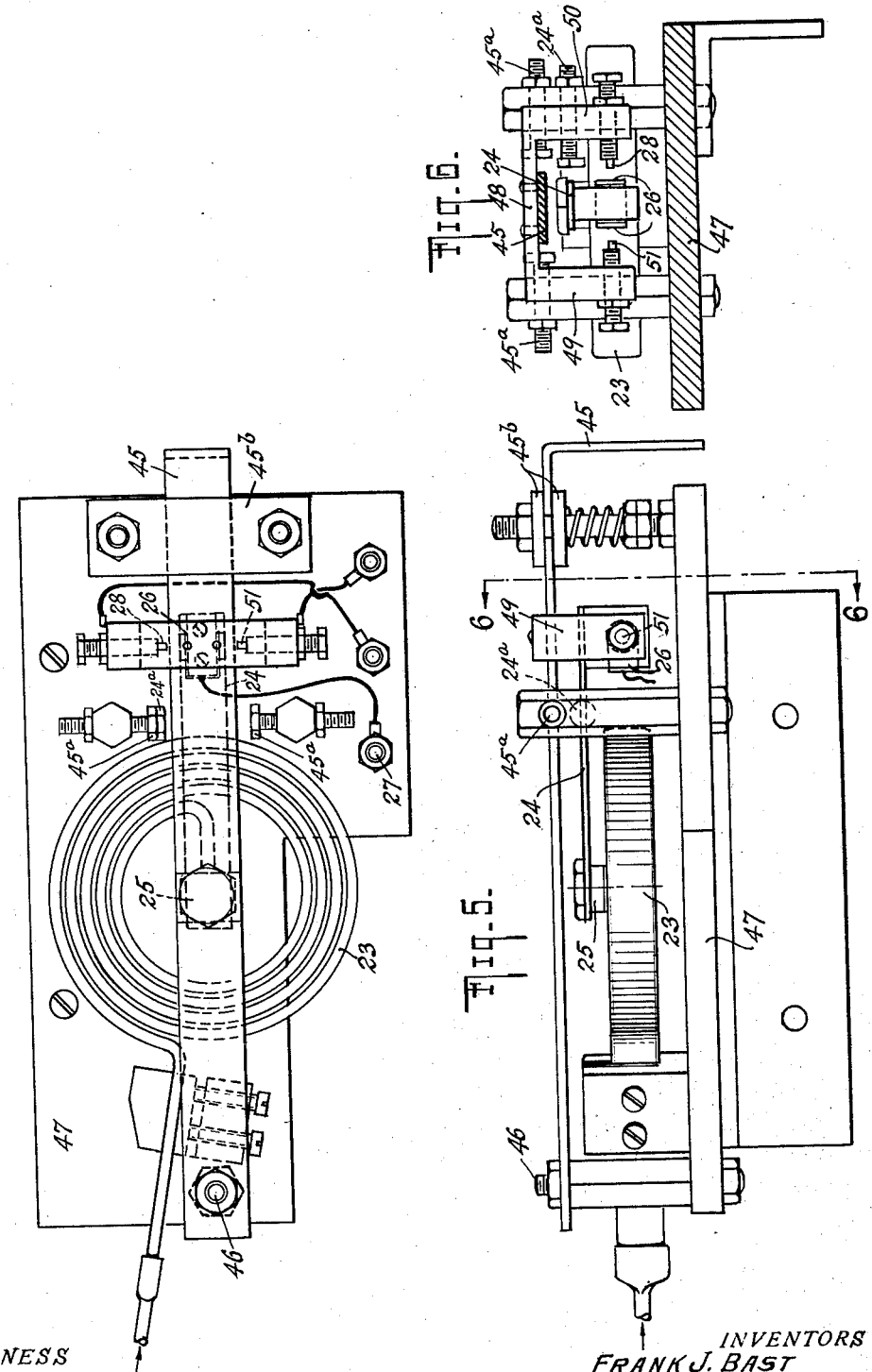
WITNESS
G. V. Rasmussen
INVENTORS
FRANK J. BAST
LAWRENCE C. IRWIN
BY
ATTORNEYS

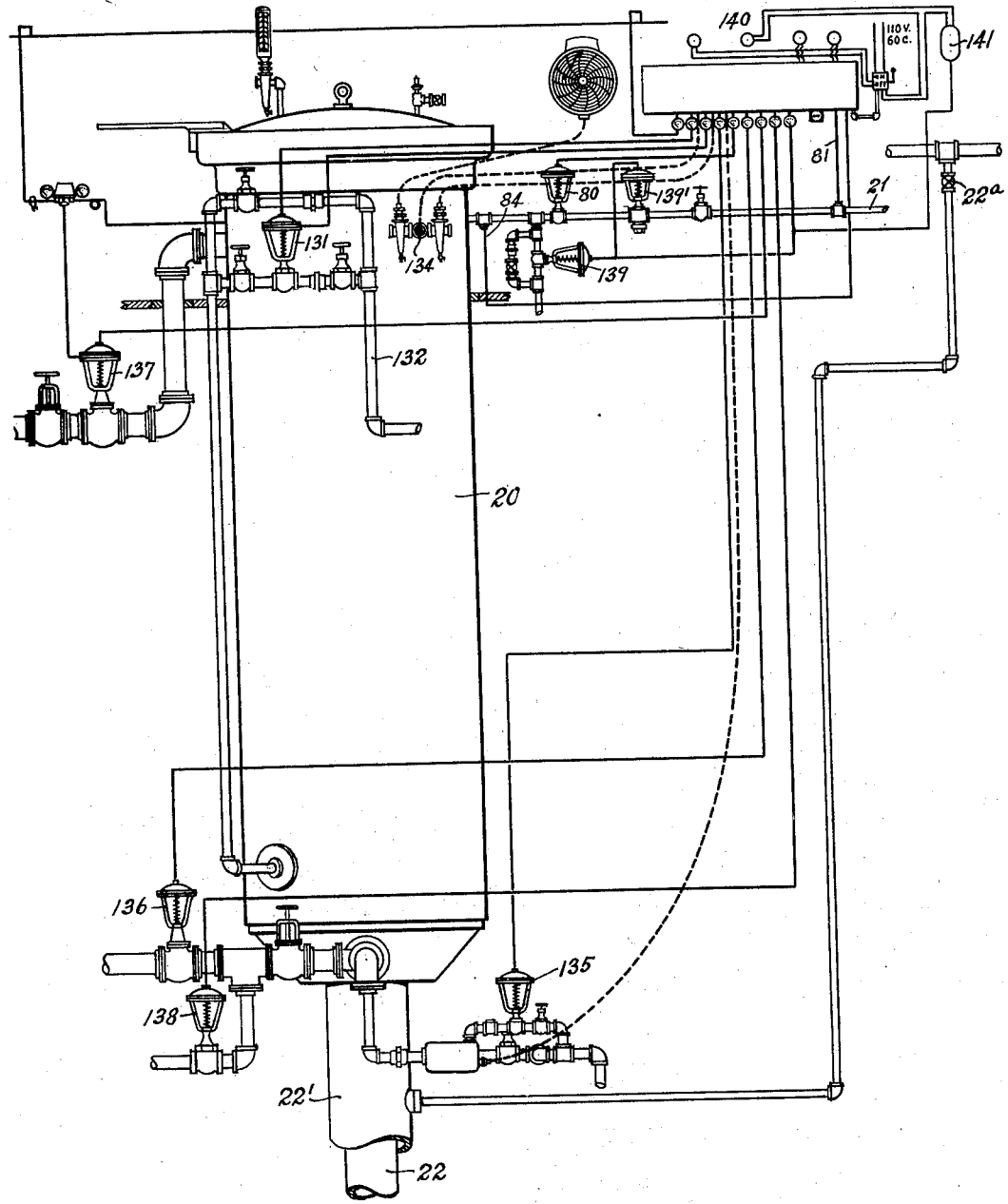

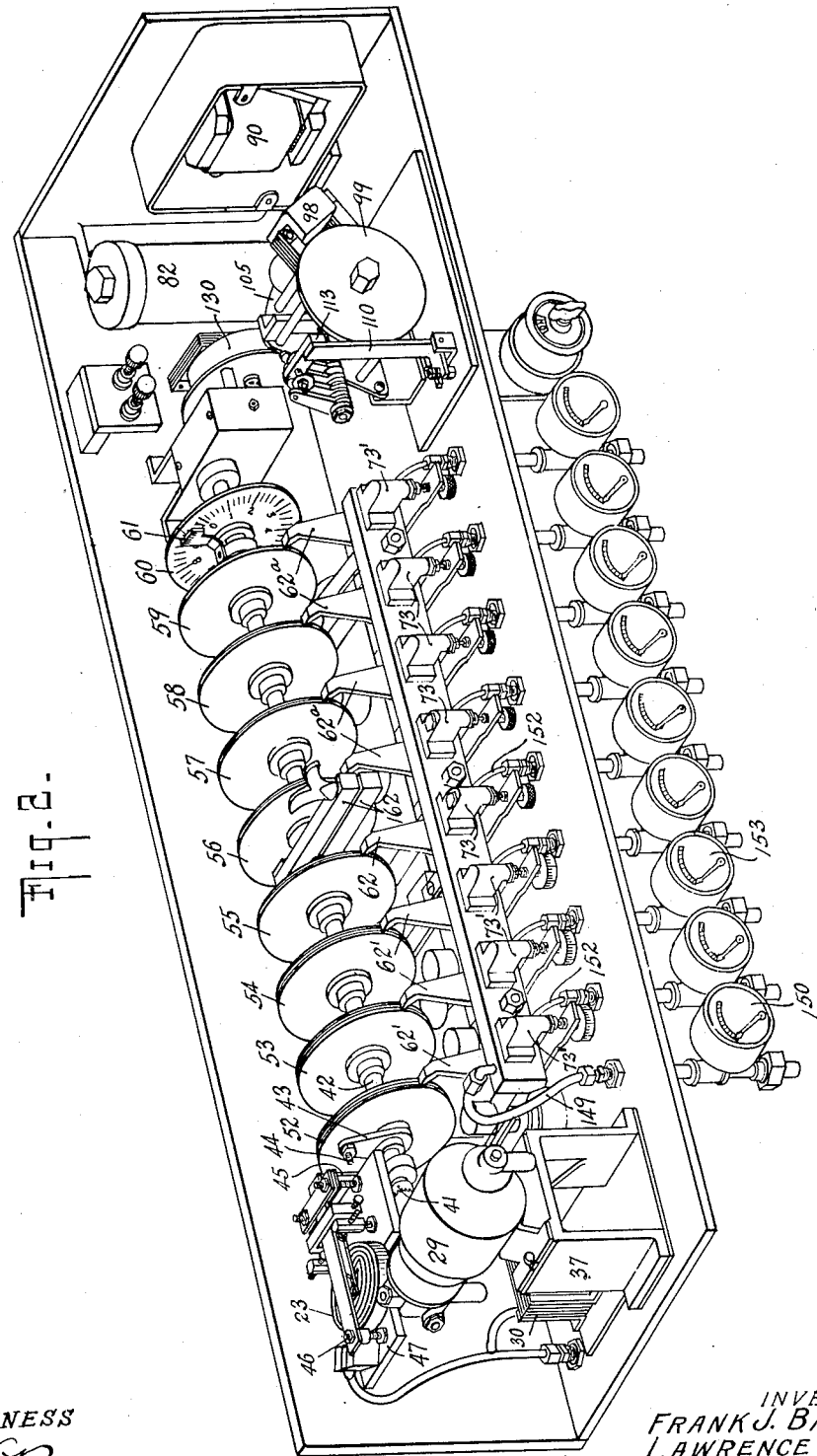

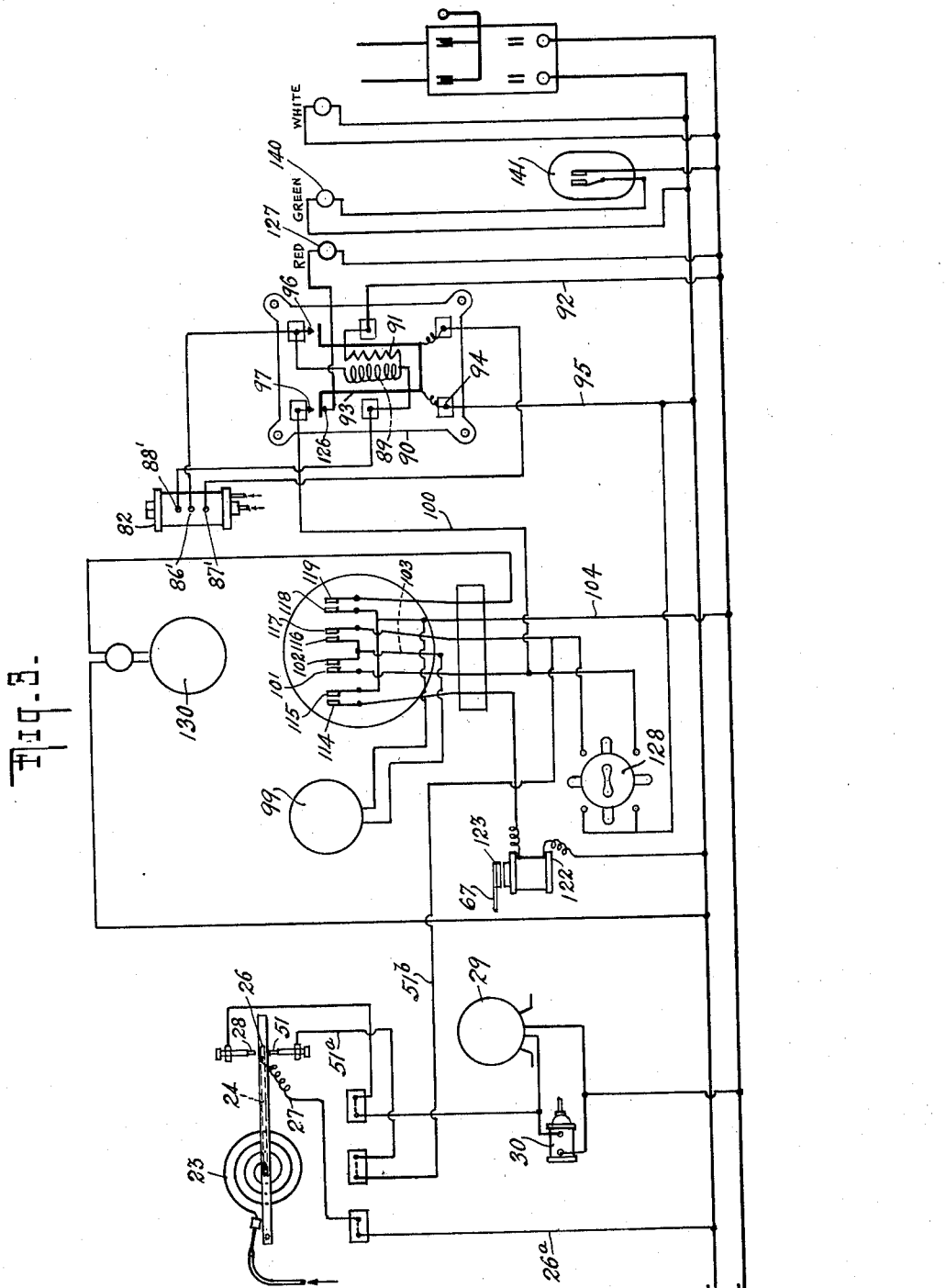

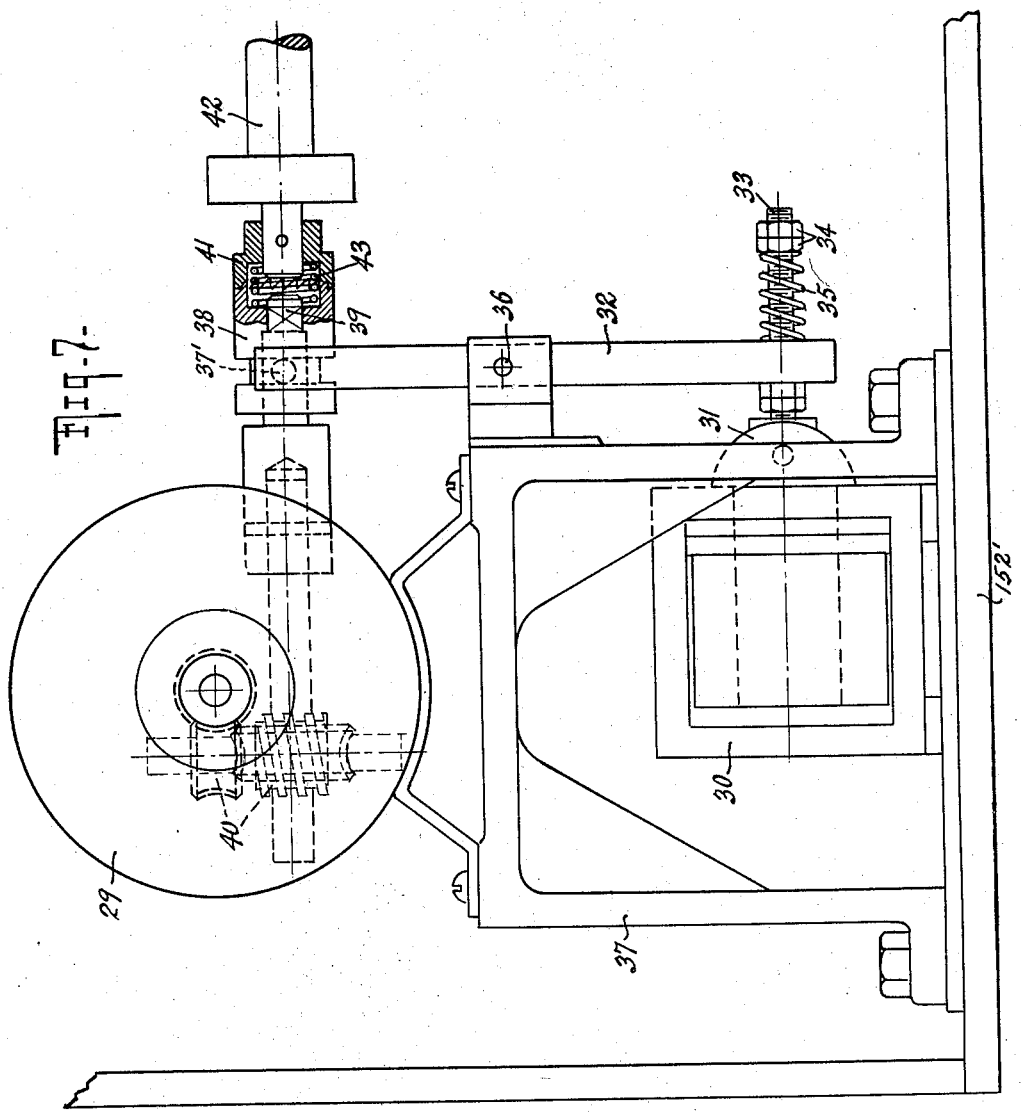

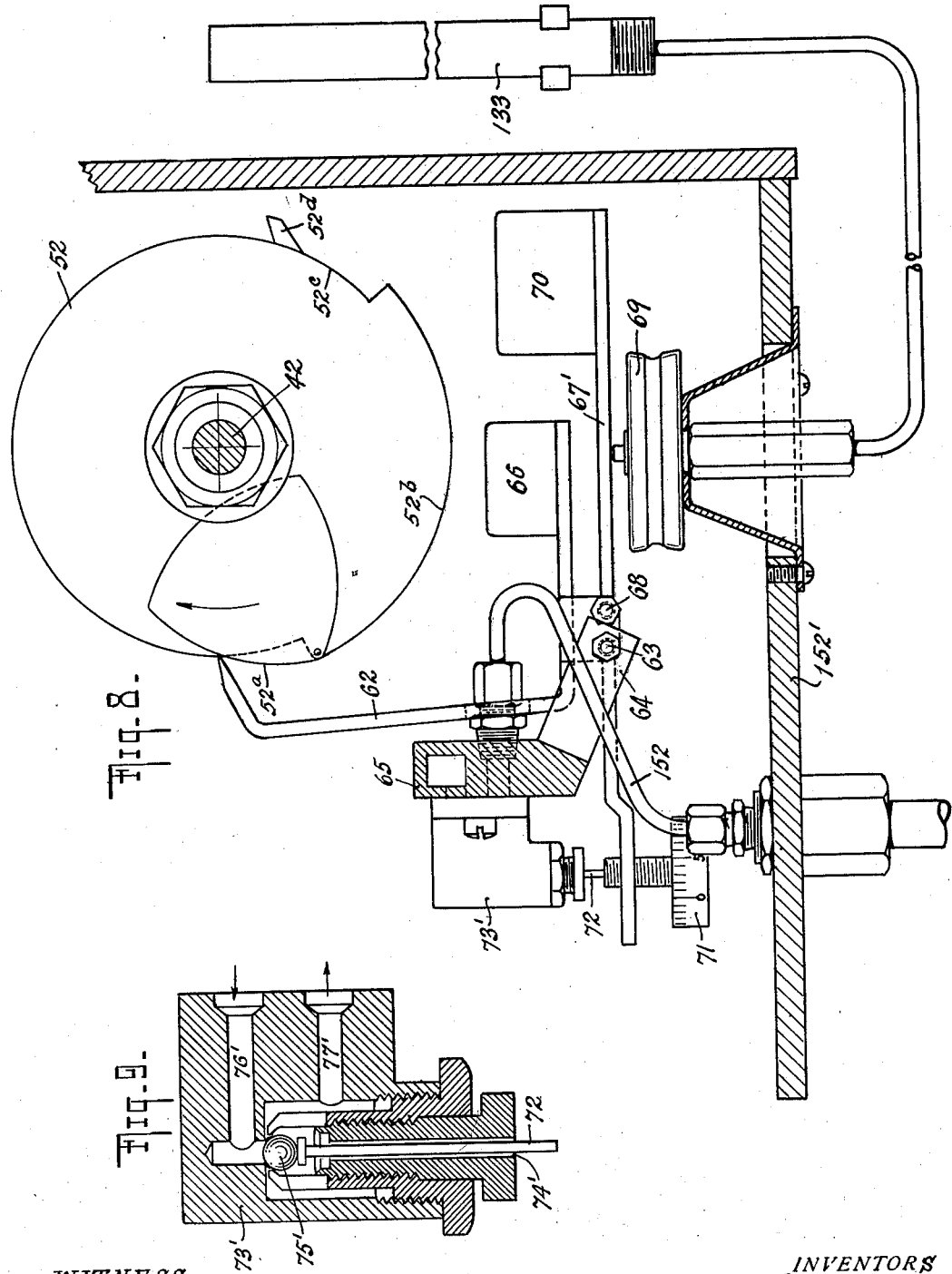

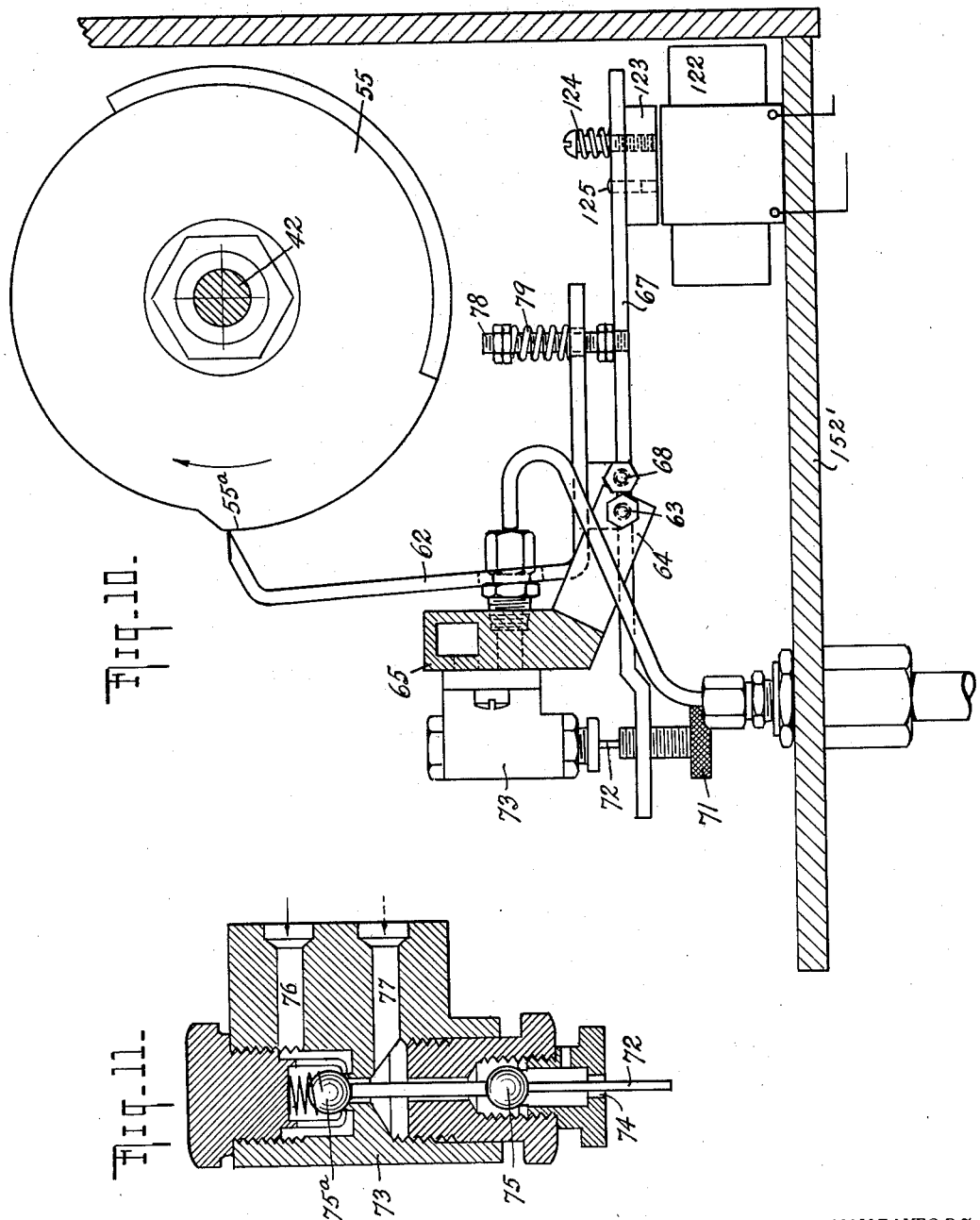

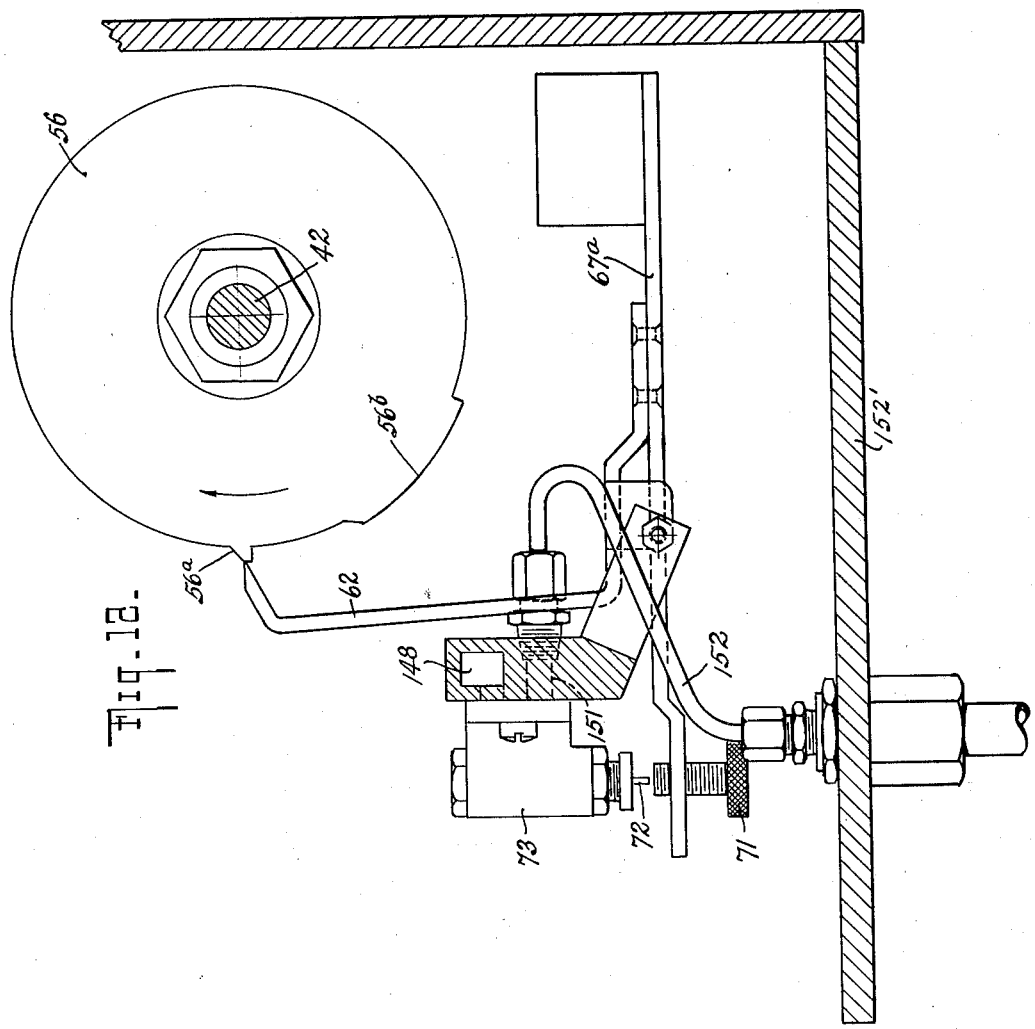

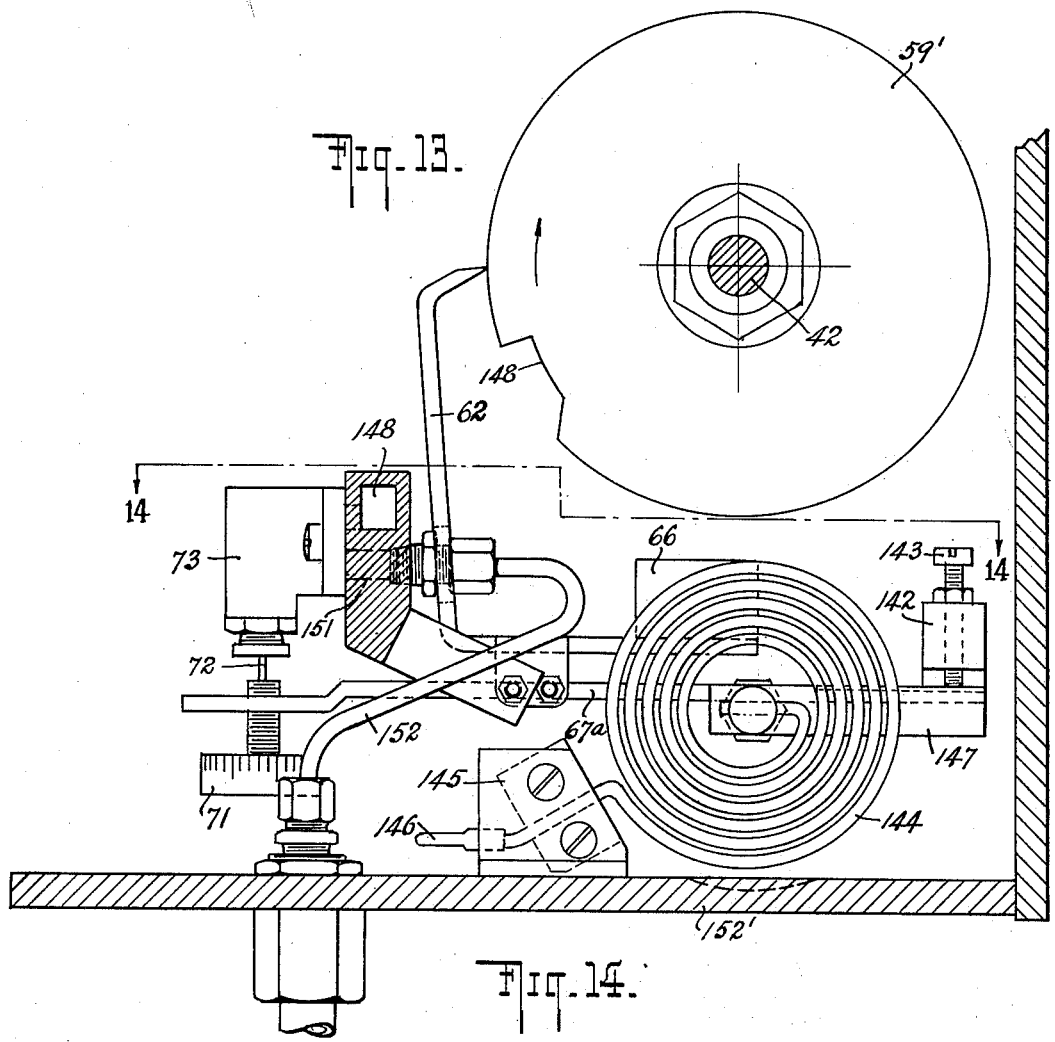
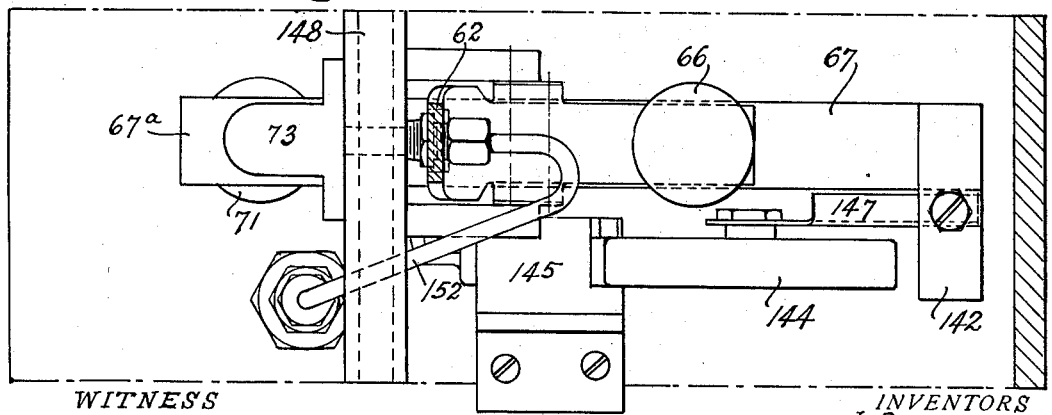

May 22, 1934.  F. J. BAST ET AL  1,959,336
AUTOMATIC CYCLE CONTROLLER
Filed July 1, 1929   13 Sheets-Sheet 10
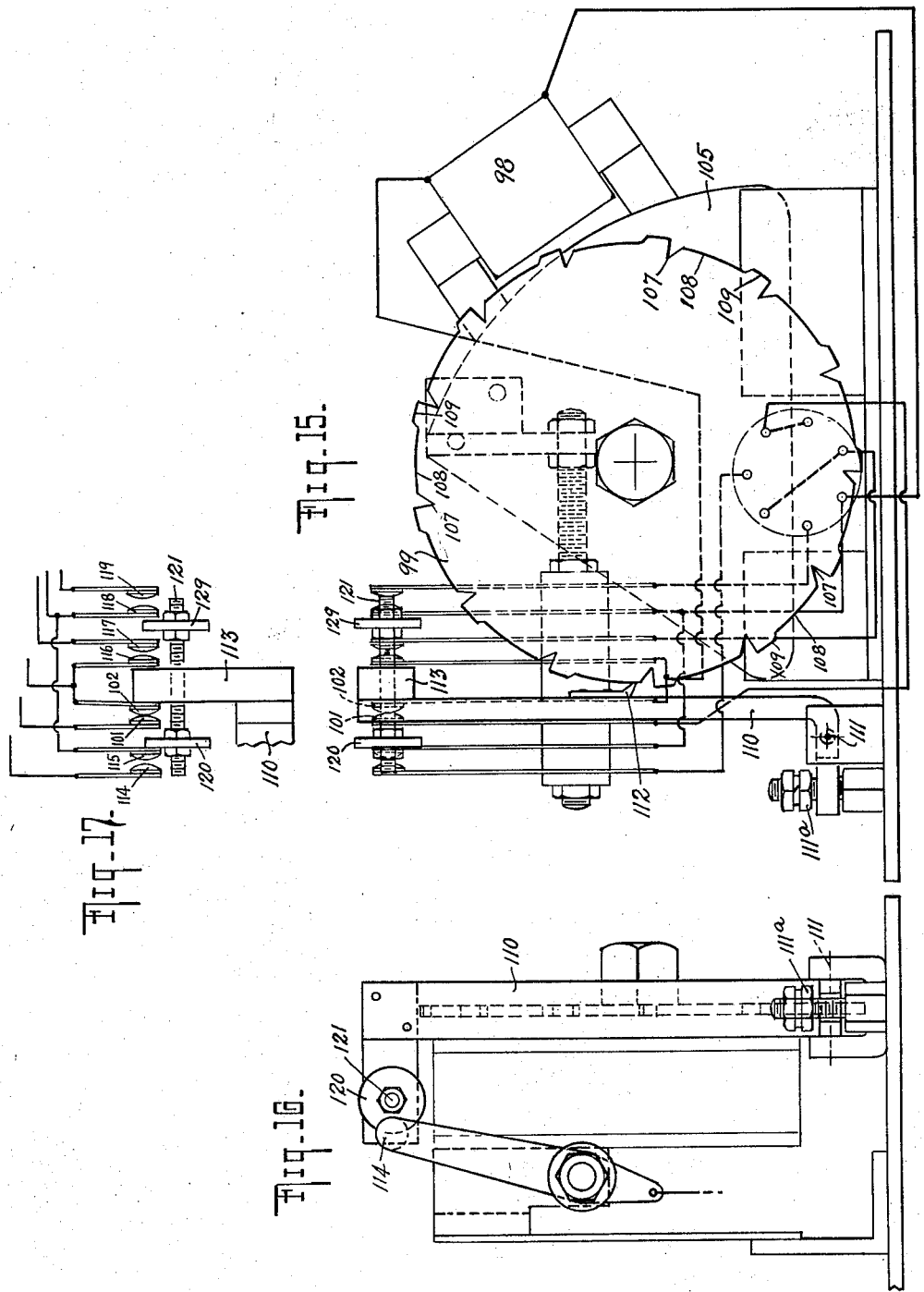
WITNESS
INVENTORS
FRANK J. BAST
LAWRENCE C. IRWIN
BY
ATTORNEYS May 22, 1934.    F. J. BAST ET AL    1,959,336
AUTOMATIC CYCLE CONTROLLER
Filed July 1, 1929    13 Sheets-Sheet 11
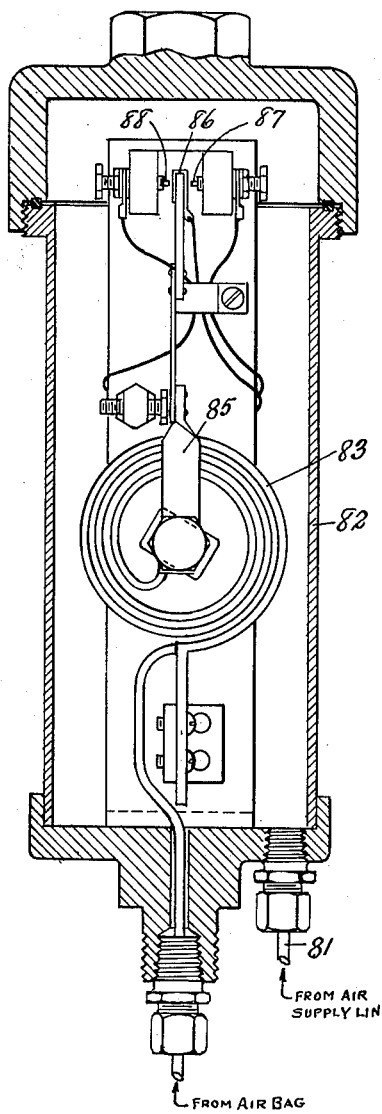
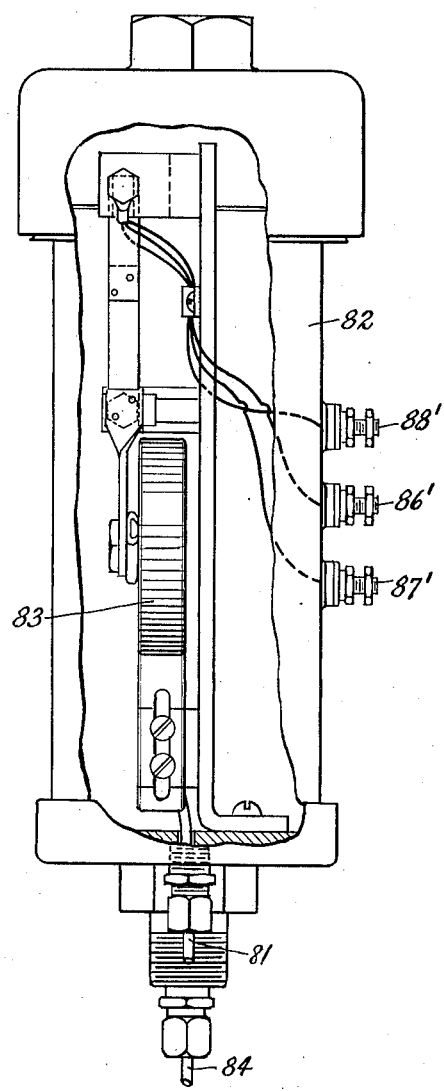
WITNESS
INVENTORS
FRANK J. BAST
LAWRENCE C. IRWIN
BY
ATTORNEYS May 22, 1934. F. J. BAST ET AL 1,959,336
AUTOMATIC CYCLE CONTROLLER
Filed July 1, 1929 13 Sheets-Sheet 12
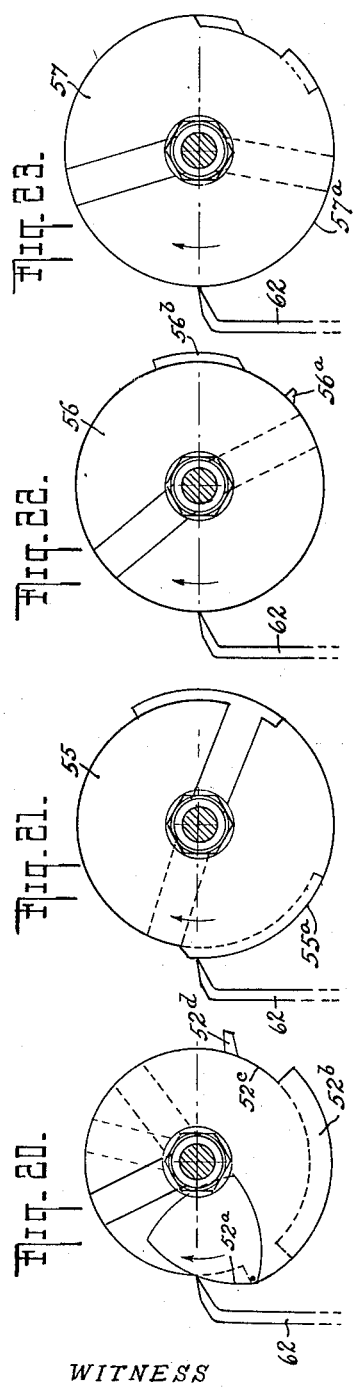
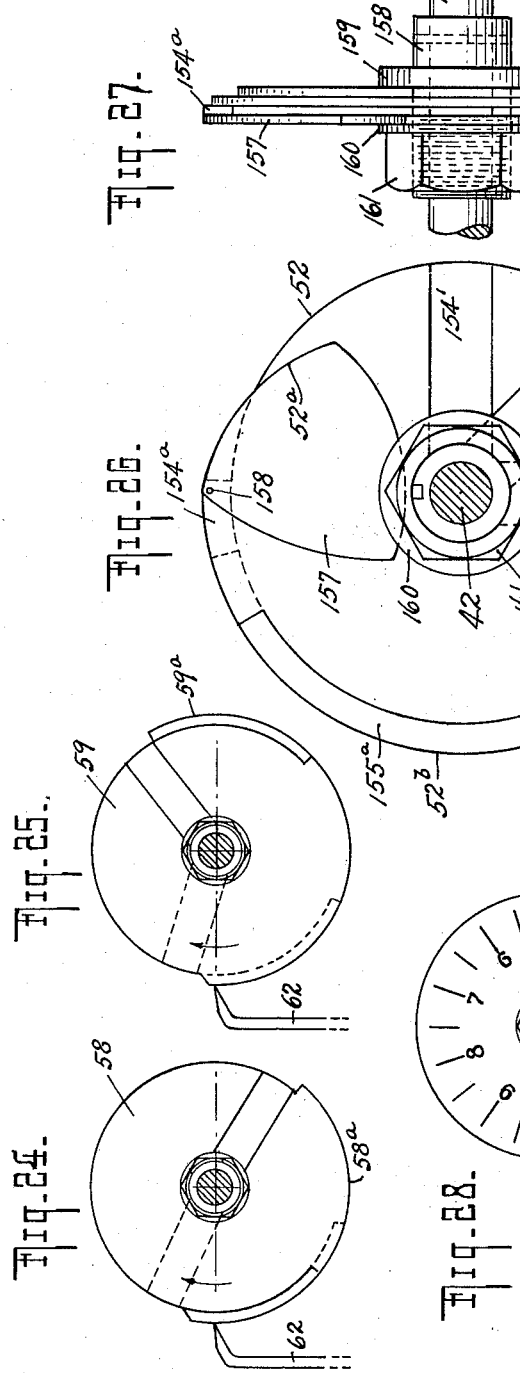
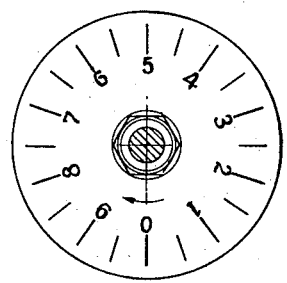
WITNESS
G. V. Rasmussen
INVENTORS
FRANK J. BAST
LAWRENCE C. IRWIN
BY
ATTORNEYS

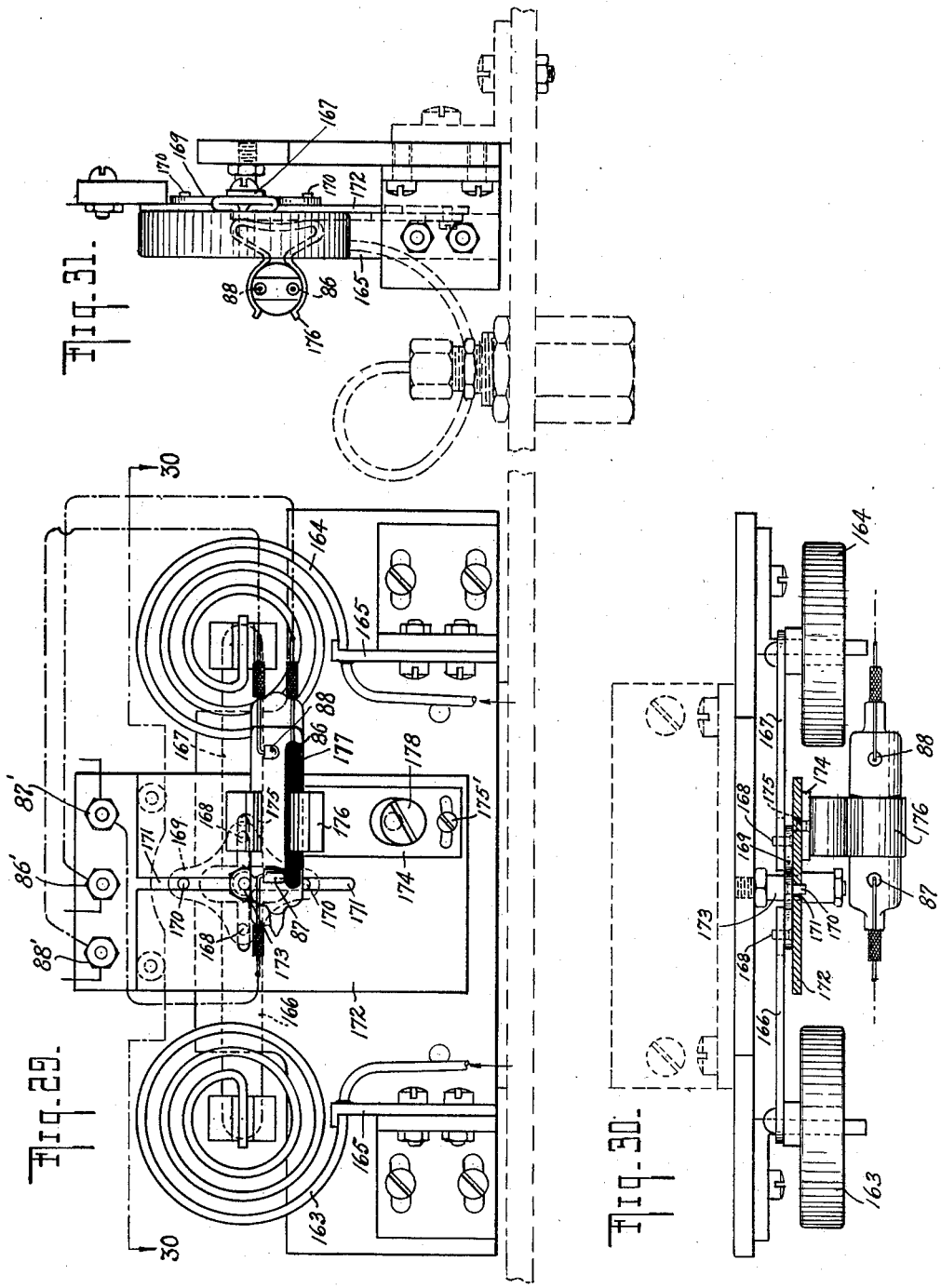

Patented May 22, 1934

1,959,336

UNITED STATES PATENT OFFICE 1,959,336

AUTOMATIC CYCLE CONTROLLER

Frank J. Bast, Queens Village, and Lawrence C. Irwin, Brooklyn, N. Y., assignors to Charles J. Tagliabue Mfg. Co., Brooklyn, N. Y., a corporation of New York Application July 1, 1929, Serial No. 375,263

32 Claims. (Cl. 18—17)

Our invention relates to automatic controllers and more particularly to a controller for automatically timing and regulating a series or cycle of operations.

In many industries an article in the process of manufacture is subjected to a series or cycle of operations, or to a treatment involving a relatively large number of steps and ordinarily requiring manual control or at least supervision by a workman. An example of such treatment is to be found in the vulcanizing or curing of rubber tires, such treatment requiring regulation and control of a number of factors, such as time, temperature, and pressure. In the process of vulcanization, a number of tire molds, each containing a tire, are usually stacked in a retort, each tire being provided with an air bag which is connected to an air line, and the retort then closed. Air is then charged into the bags until a definite pressure is reached, whereupon steam is fed into the retort to effect the curing of the tires. For best results the rise in temperature in the retort should follow a predetermined curve, and the maximum temperature should be maintained for a definite period of time, after which the steam is discharged. Cooling water is then admitted into the retort and at a predetermined instant the water is discharged and steam again fed to the retort to warm the tires to facilitate their removal from the molds.

These several steps, or a different series of steps in different processes, have up to the present time been initiated and controlled manually. When, for example in the vulcanization process above outlined, a leak occurred in one or more of the air bags, the air was manually shut off, the leak repaired and the cycle again begun through manual control. This manual control is objectionable both because of the expense and also because of the introduction of the human or personal equation and the consequent danger of over or under-curing or improper curing or other treatment.

It is an object of the present invention to eliminate as much as possible the human agency and the personal equation in the control of a series of operations or steps occurring in sequence and to regulate and control the same automatically.

It is a further object of the invention to provide a novel mechanism which will automatically detect an irregularity in the cycle of operations, will stop the operation or treatment and notify the operator that an abnormal condition exists.

More specifically, it is an object of the invention to provide a mechanism which, having been once set, will automatically determine the instants at which air, steam and cooling water, or other media, are charged to a vulcanizing or other retort, the length of time during which these media are permitted to act, and the discharge of the same. It is a further object of the invention to provide a mechanism which, when adapted for use with a vulcanizing retort, will automatically be set into operation upon the opening of the valve which controls the flow of water under pressure to the ram which packs the molds into the retort. Our invention also contemplates the provision of automatic devices which will stop the action of the controller should there be a serious leak in any of the air bags. A further object of the invention is to provide mechanism for quickly and automatically resetting the controller to zero upon the beginning of a cycle of operations. Another object is to provide mechanism for discharging air from the bags to avoid injury thereto when the water pressure falls below a predetermined safe minimum sufficient to hold the ram in raised position. A still further object is to provide an adjustable timing mechanism whereby the time schedule according to which the several steps of a cycle or process take place may be varied.

Other objects and advantages of our invention will appear more fully from the following description taken in connection with the accompanying drawings which illustrate an embodiment of our invention without defining its limits. In said drawings, in which our invention is shown embodied in a mechanism for controlling the cycle of operations in a rubber tire vulcanizing retort, Fig. 1 is a diagrammatic view of the retort and its operating connections; Fig. 2 is an assembly view of the controller, the cover plate being removed; Fig. 3 is a schematic diagram of the electrical wiring and connections; Fig. 4 is a plan view of a hydraulically controlled switch forming part of the zero setting mechanism; Fig. 5 is a front elevation thereof; Fig. 6 is a vertical section taken in line 6—6 of Fig. 5; Fig. 7 is a view in elevation partly in section of an electrically operated clutch controlled by the switch shown in Fig. 4; Fig. 8 is a section illustrating one of the control lever arrangements, and its associated cam, for controlling the supply of steam to the retort, the cam being in the zero position; Fig. 9 is a central section of a direct acting control valve shown in Fig. 8; Fig. 10 is a side elevation of the control lever arrangement and its associated cam for controlling the feed of compressed air to the air bags, the cam being in the zero position and causing air to be charged to the air bags; Fig. 11 is a central section through the reverse acting control valve ilustrated in Fig. 10; Fig. 12 is a side elevation of the control lever arrangement and its associated cam for controlling the blow-off of steam from the retort, the cam being in advanced position; Fig. 13 is a control lever arrangement and its associated cam for controlling the discharge of air from the air bags and including a safety mechanism operated by fall of pressure in the hydraulic line, the cam being in the position it occupies toward the end of the cycle; Fig. 14 is a plan view of the construction shown in Fig. 13 with parts removed for the sake of clearness; Fig. 15 is a diagrammatic view of a clock and the electrical spring contacts controlled thereby; Fig. 16 is a side view thereof looking toward the right; Fig. 17 is a plan view of the contact arrangement shown in Fig. 15; Fig. 18 is a section through a differential air pressure switch forming part of the mechanism for making the leak test; Fig. 19 is a side elevation thereof, the casing being partly broken away to show the interior structure; Figs. 20 to 25 are views of the several timing cams, showing their relative angular positions upon the common shaft at the beginning of the cycle, i. e. in zero position; Fig. 26 is an enlarged view of one of the cams illustrating the component parts thereof whereby adjustment of the cam for different operating schedules is secured; Fig. 27 is a front elevation thereof; Fig. 28 is a view of the indicator dial employed with the zero setting mechanism; and Figs. 29, 30 and 31 represent, respectively, a front elevation, plan and side view of a differential mechanism adapted to be employed in place of the mechanism shown in Figs. 18 and 19 when water or steam instead of air is employed to inflate the bags in the tires positioned in the vulcanizing retort, Fig. 30 being a partial section along the line 30—30 of Fig. 29.

The rubber tires to be cured are placed, in a manner well known in the art, in iron molds each composed of two separable sections which are stacked in a vertical retort 20 (Fig. 1). Each tire has a rubber air bag placed inside it, the bags being connected to an air manifold (as shown for example, in the patent to Kilborn et al. No. 1,477,879) which is connected to a valve-controlled air line 21. A hydraulically operated ram 22 movable in a cylinder 22' is then operated to force the molds into position within the retort 20. The tires are now ready to be subjected to the several steps which comprise the curing treatment.

The automatic controller forming the subject-matter of the present invention is constructed and adjusted to control the sequence and duration of the several operations performed on the tires in the retort 20. These operations may, for example, consist of the following and have the duration indicated, and the controller will be described in connection therewith: 5 minutes to fill the air bags; 1 minute to test the air connections inside of the retort (5 pound leak permitted during the one minute interval); 30 minutes to raise the temperature to the vulcanizing temperature; 2 hours for curing the tires at such temperature; 3 minutes to blow off steam after the same has been shut off; 30 minutes to cool with a water spray, and finally 10 minutes to warm the molds to facilitate removal of the tires therefrom.

To aid in a clear understanding of the invention the same will be described under the following headings:

I. Zero setting mechanism.
II. Air controlling mechanism for regulating the feed of air to the bags and automatically testing the connections for a leak.
III. Steam controlling mechanism for regulating the feed of steam and for controlling the rise of temperature along a definite curve.
IV. Water controlling mechanism for regulating the feed of cooling water.
V. Steam controlling mechanism to effect warming of the molds.
VI. Air shut off mechanism.

*I. Zero setting mechanism.*—After the tire molds have been stacked in the retort 20 and the connections between the air bags of the molds and the air manifold completed, a hydraulic valve 22a is opened to charge water under a pressure of about 800 lbs. per square inch into the cylinder 22' to raise the ram 22 so as to pack the molds tightly in the retort. The water under pressure is simultaneously fed to a Bourdon spring 23 of a differential hydraulic pressure switch (Figs. 2 and 4) through any suitable connection, such spring being thereby caused to expand and rotate an arm 24 about a pivot 25 fixed to the free inner end of the spring. The arm 24 carries an electric contact 26 which is connected by a flexible wire to a terminal 27. As the arm 24 moves in response to the expansion of the Bourdon spring, the contact 26 comes into engagement with a contact screw 28, thereby completing a circuit to motor 29 (Figs. 2, 3 and 7) and at the same time to an electromagnet 30. Upon energization of such magnet, an armature 31 is drawn to the left as viewed in Fig. 7, and carries with it a clutch lever 32. This lever is perforated at its lower end to receive a threaded extension 33 on the armature 31, the extension being provided with an abutment nut 34, and a spring 35 positioned between said nut and the lever 32; there is thus provided a spring-cushioned connection between the armature 31 and the lever 32. The latter is pivoted at 36 upon a motor supporting bracket 37 and is bifurcated at its upper end, the bifurcations being provided with pins 37' which project into a reduced section of a sleeve 38 slidably mounted upon a square shaft 39 driven by motor 29 through the reduction gearing 40. The sleeve 38 forms one half of a clutch member, the other half 41 of which is rigidly mounted upon a cam shaft 42 (Figs. 2 and 7). When the lever 32 is swung clockwise upon energization of the electromagnet, the sleeve 38 is slid into engagement with the clutch member 41 and the shaft 42 thus connected to the motor 29. A spring 43 may be positioned between the clutch members 38 and 41 and operates to disengage the same upon deenergization of the electromagnet 30.

On the shaft 42 (Fig. 2) is fixed an arm 43 carrying a pin 44. Extending into the path of the pin 44 is a lever 45 pivoted at 46 on a supporting plate 47 which also supports the spring 23 (see also Figs. 4, 5 and 6). A yoke 48 of insulating material is fixed to the lever 45, said yoke having depending members 49 and 50 which support the contact 28, above described, and a second contact 51. It will be clear that upon swinging of the lever 45 the contacts 28 and 51 will be moved relatively to the contact 26 on the arm 24. The movement of the arm 24 and lever 45 may be limited by adjustable stops 24a and 45a respectively. The lever 45 may be held in adjusted position between spring-pressed friction plates 45b.

Upon rotation of the shaft 42 by the motor 29, the pin 44 strikes the lever 45 and moves the same, thereby breaking the contact between the points 26 and 28, deenergizing the motor and also the electromagnet 30, and throwing out clutch 38, 41. The shaft 42 thus stops at a predetermined or zero position. The motor 29 operates at high speed and quickly brings the shaft to the zero position.

Upon the shaft are mounted a plurality of cams 52, 53, 54, 55, 56, 57, 58, and 59, whose purpose will be explained more fully hereinafter. The angular position of the cam shaft 42 is indicated by a dial 60 fixed on such shaft and cooperating with a pointer 61 supported in fixed position relatively to the shaft and provided with a vernier scale as shown in Fig. 2. The cams 52 to 59 inclusive are designed to control the several operations constituting the vulcanization process and to initiate and stop such operations at predetermined moments. The cams 52 and 53 are duplicates and control the feed of steam to the vulcanizer; cam 54 controls the discharge of condensed steam; cam 55 regulates the inlet of air to the air bags; cam 56 controls the blow-off of steam following the completion of the vulcanization and also after the reheating of the molds; cams 57 and 58 regulate the admission and discharge of cooling water respectively; and cam 59 controls the blow-off of air from the air bags prior to the removal of the tires from the retort.

II. *Air controlling mechanism.*—The cam 55 controls the charging of compressed air into the air bags of the molds and is shown in its zero position in Fig. 10, the shaft 42 having been stopped in such position in the manner explained above. Cooperating with the cam is a lever 62 fulcrumed at 63 upon an arm 64 extending from a horizontal beam 65 (which similarly supports other levers 62 cooperating with the other cams as shown in Fig. 2). A second lever 67 is pivoted intermediate its ends at 68 upon a bracket depending from the lever 62 and is resiliently connected to the lever 62 by means of a bolt 78 and spring 79, so that it follows the movements of lever 62. The lever 67 carries an adjustable screw 71 which is adapted to engage a valve pin 72 of a reverse acting control valve 73 (Fig. 11). In the position of the parts shown in Fig. 10, the lever 62 is in engagement with a raised cam surface 55a on the cam 55 and has been swung counter-clockwise; the screw 71 has thus been lowered and the valve pin 72 of the control valve 73 permitted to drop. The pin 72 moves in a bore 74 of greater diameter than such pin and is connected to a ball 75 and to a second ball 75a. The valve includes also a conduit or channel 76 which is adapted to be connected to a source of compressed air, such air, when the balls 75 and 75a are in their raised position, passing through a conduit or channel 77 to the diaphragm chamber of a diaphragm valve 80 (Fig. 1) associated with the control valve to close the diaphragm valve as described hereinbelow. The ball 75 operates at the same time to shut off channel 77 from the bore 74. When, however, the valve pin 72 is in its lower position, as shown in Figs. 10 and 11, the feed of air into channel 77 is cut off and the latter placed in communication with the bore 74, thus permitting the air in the diaphragm valve 80 to discharge into the atmosphere through bore 74, the valve 80 being then opened by its spring. The valve 80 is located in the air line 21 and controls the feed of air to the air bags.

It will thus be seen that as the shaft 42 and the cams thereon are set to zero, air is automatically fed to the air bags in the molds through the valve 80.

The mechanism for detecting a leak of more than a fixed amount, say five pounds, per minute, comprises the following: A conduit 81 (Figs. 1, 18, and 19) connects the air line 21 with the interior of the casing 82 of a differential air pressure switch mechanism, the casing containing a Bourdon spring 83 whose outer fixed end is connected by a conduit 84 to a point on the air line to the rear of valve 80 (Fig. 1). The inner end of the Bourdon spring is fixed to an arm 85 carrying a contact 86 which normally rests against a contact 87, i. e. when the pressures within the casing and in the spring 83 are the same. This condition exists when the valve 80 is opened as the cam shaft 42 reaches the zero position. When, however, the pressure in the spring falls below that in the casing 82, or is zero (when the device is not in operation), the interior of the casing 82 being, however, in communication with the source of compressed air, the spring contracts and oscillates arm 85 to cause contact between contact 86 and a third contact 88. The contacts 86, 87, and 88 are connected respectively to the terminals 86', 87' and 88' mounted on the casing 82.

When the diaphragm valve 80 is opened, the pressures in casing 82 and spring 83 are equal, and contact consequently made between 86 and 87. This closes a circuit through the coil 89 of a relay 90 (Fig. 3), the complete circuit including the contact 86, terminal 86', coil 89, a resistance 91, and a wire 92 to the negative power line, and the contact 87, terminal 87', an armature 93, a terminal 94, and a wire 95 to the positive power line. The coil 89 is thus energized and attracts the armature 93, thereby closing the contacts at 96 and 97, and completing a circuit through a motor 98 (Fig. 15) which operates a clock 99, such circuit including the positive power line, wire 95, terminal 94, armature 93, contact 97, conductor 100, contacts 101 and 102 which are normally closed as explained hereinafter (see Figs. 15 and 17), conductor 103, and through conductor 104 to the negative line.

It will be recalled that five minutes are to be allowed for filling the air bags before the leak test is made; that is, valve 80 is to be kept open for that length of time and then closed to determine whether a leak exists in the air bags. This timing is accomplished by means of the clock 99 shown in detail in Figs. 15 and 16. The clock includes a support 105 upon which is mounted a cam disk 106 provided with a plurality of series of steps 107, 108, and 109 about its circumference. A lever 110 pivoted at 111 cooperates with said disk and is provided with a nose 112 adapted to engage said steps in succession as the disk rotates. The lever 110 has a lateral extension 113 at its upper end and is adapted to control the spring contacts 101 and 102 and also spring contacts 114, 115, 116, 117, 118 and 119. The movement of the lever 110 may be limited by an adjustable stop 111a.

In the zero position of the parts, the nose 112 of the lever 110 rests on the step 108 as hereinafter explained; in this position the extension 113 presses contact 102 against contact 101, such contacts forming part of the circuit to the motor 98 above described and being in series with the contact 97 on the relay 90 (Fig. 3). The cam disk 106 is thus set into rotation by the motor 98; the nose 112 rides along the step 108 and in five minutes reaches the step 109, the speed of the motor being suitably reduced. During these five minutes the valve 80 remains open and feeds air to the air bags. The lever 110, upon engaging step 109, is swung to the left and forces contact 115 against contact 114 by means of a nut 120 adjustably mounted upon a threaded bar 121 fixed to the extension 113. The contact at 114, 115 completes a circuit to an electromagnet 122 (Figs. 3 and 10) which thereupon attracts an armature 123 mounted upon the lever 67 associated with cam 55, the armature being resiliently connected to said lever by means of a bolt and spring connection 124 and guided by a pin 125. The lever 67 is thus oscillated in a clockwise direction against the action of spring 79 and raises the valve pin 72. The balls 75 and 75a of the reversely acting valve 73 are thus raised, the ball 75 being forced against its upper seat to shut off channel 77 from bore 74, while the ball 75a is raised from its seat, whereupon air under pressure flows from the conduit 76 through the conduit 77 to the diaphragm valve 80 (Fig. 1). The latter is thus closed and interrupts the communication between the air line and the air bags. The air in pipe 84, the latter being connected to the air line 21 at the rear of valve 80, is now at the pressure of the air in the bags, while the air conducted by the pipe 81 to the casing 82 (Fig. 18) is at the pressure of the air line 21.

The step 109 is one minute long, which is the time allowed for making the air leak test, that is, the time during which the valve 80 is temporarily closed. If the air connections to the air bags leak, the differential Bourdon spring 83 inside the casing 82 will break the contact between 86 and 87 and thus break the circuit to the coil 89. The latter, however, remains energized as it is located also in the circuit 92, 91, 96, 93, 94, 95. The armature 93 thus remains in its raised position and the clock 99 continues to run. If the leakage amounts to five pounds or more before the minute has elapsed, contact will be made between the points 86 and 88. Coil 89 will then be short-circuited through the resistance 91 and the armature 93 will drop, breaking contact at 96 and 97. The circuit to the motor 98 is thus broken, and the electric clock 99 stopped, the nose 112 being on step 109. The armature at the same time makes contact at 126, thereby closing a circuit to a red signal light 127 which notifies the operator that a leak exists which must be repaired. The hydraulic pressure is then turned off and the water released from the ram of the vulcanizer, while the air line 21 may be shut off by closing of a manually operated valve and the air discharge from the air bags.

After the repair of the leak the operator opens the hydraulic valve 22a and also turns a switch 128 to its "on" position, thereby closing a circuit to the motor 98 (the contacts 101 and 102 are still closed) and again operating the clock 99, the disk 106 thereupon rotating until the nose 112 falls off the step 109 and onto the step 107. The contacts 114 and 115 are thereupon broken, causing deenergization of the electromagnet 122 and permitting the lever 67 (Fig. 10) to move in a counter-clockwise direction under the action of spring 79. The valve pin 72 thereupon drops and causes discharge of the operating air from the valve 80 through the conduit 77 and bore 74 into the atmosphere. Valve 80 then opens and again places the bags in communication with the air line 21 which in the meantime has been opened. The dropping of the nose 112 onto the step 107 also breaks at 101, 102 the circuit of the motor operating the clock 99 the switch 128 being manually opened at such time, whereupon the clock stops. At the same time the extension 113 on the lever 110 closes the spring contacts 118 and 119 through the intermediary of a nut 129 on the bar 121. The contact 119 is thus connected to the contact 115 which is electrically joined to the contact 118 and closes a circuit to a motor operating a clock 130 geared to the cam shaft 42 and from this point on rotates the shaft 42 at a very slow speed, i. e. about one revolution every five hours. The lever 112, when on the step 107, also effects contact between the terminals 116 and 117 for a purpose to be described hereinafter. Should it be desired to re-test the bags after the repair of a leak, the switch 128 is kept closed, the clock 99 then continuing to operate, and when the nose 112 has risen onto step 108, the switch is opened. If no leak is detected, the nose 112 will ultimately fall into step 107 and the motor 130 will be started.

*III. Steam controlling mechanism.*—The cams 52, 53 and 54 control the admission of steam and discharge of condensate from the vulcanizer. As these cams are similar in construction, a description of one of them will suffice for all three. Cam 52 is shown in detail in Fig. 8 and is in zero position, the shaft 42 having been stopped in this position as explained above. A lever 62 similar to the lever 62 shown in Fig. 10 is fulcrumed at 63 upon an arm 64 extending from the beam 65 and cooperates with the cam. A lever 67' is pivoted intermediate its ends at 68 upon a bracket extending from the lever 62, and rests upon a capsular spring 69, the lever being counterweighted at 70. The lever 67' carries an adjustable screw 71 which is arranged to engage the valve pin 72 of a direct acting control valve 73'. In the zero position of the parts shown in Fig. 8, the screw just touches the pin 72 which is in its lowermost position. The pin 72 moves in an enlarged bore 74' and engages a ball 75'. When in its lower position, i. e. upon its lower seat, the ball closes the upper end of bore 74' and permits compressed air entering at 76' to pass into a channel 77' and thence to a diaphragm valve 131 located in the steam line 132 (Fig. 1). When the ball is raised against its upper seat, as shown in Fig. 9, it cuts off the supply of air to the diaphragm valve 131 and causes discharge of the air in the casing of such valve into the atmosphere through bore 74' whereupon valve 131 opens.

As the cam shaft 42 is rotated by the clock mechanism 130, the lever 62 (Fig. 8) begins to ride on an inclined cam surface 52a of cam 52 and causes the screw 71 to lift gradually the valve pin 72, whereby the air in the diaphragm valve 131 is discharged into the atmosphere and the valve opened to feed steam from the line 132 into the retort 20. It will be obvious that by varying the inclination of the cam surface 52a the speed of opening of valve 131 can be controlled and the time in which the temperature in the retort reaches a predetermined value varied.

As the temperature in the vulcanizer rises, the capsular spring 69 (Fig. 8) expands, the same being connected to a bulb 133 containing an expansible fluid and located in a fitting 134 on the retort, the bulb being in contact with the vapors in the retort. If the temperature of the retort rises faster than as predetermined by the cam surface 52a, the expanding capsular spring will move the lever 67' counter-clockwise thereby throttling the control valve 73', which in turn causes throttling of the steam valve 131. The length of the cam surface 52a is equivalent to 30 minutes' rotation of shaft 42. The temperature thus rises in the retort along a predetermined curve, and after thirty minutes, when the lever 62 begins to engage the circular cam surface 52b, reaches the vulcanizing temperature. Any rise in such temperature will be prevented by the capsular spring 69, until at the end of two hours the lever 62 will drop off the surface 52b onto the circular surface 52c. When this occurs, the control valve 73' is operated to effect closing of the steam inlet valve 131.

Cam 53 and its associated parts operate exactly the same as cam 52 and serve as a safety device to insure proper opening and closing of valve 131 should the thermostatic system of cam 52 become leaky or otherwise defective. The valve 131 is provided with a duplex top so as to be controlled by the control valve 73' of both cams 52 and 53.

Cam 54 (Fig. 2) and its cooperating elements function similarly to cam 52 except that the thermostatic system of the former is set to operate at about 10° below that of the latter, while the air connection of its direct acting control valve 73' is connected to a valve 135 (Fig. 1) which controls the discharge of condensed steam from the bottom of the vulcanizer.

After the lever 62 has dropped off cam surfaces 52b (Fig. 8) and stopped the flow of steam to the vulcanizer, the lever 62 cooperating with cam 56 is swung to the left upon engagement with cam surface 56a (Fig. 12) thereby lowering screw 71 and operating reverse acting valve 73. The air is thus released from diaphragm valve 136 (Fig. 1) and the steam in the vulcanizer permitted to blow off through such valve for three minutes, after which lever 62 drops off cam surface 56a, and valve 136 closes.

*IV. Water controlling mechanism.*—After the blow-off of the steam, the levers 62 cooperating with cams 57 and 58 (Figs. 23, 24) drop off the respective surfaces 57a and 58a and operate to raise the valve pins 72 of reverse acting control valves 73 associated therewith. The air acting on diaphragm valves 137 and 138 (Fig. 1) is thus discharged into the atmosphere and the valves permitted to open under the action of their springs. Cooling water is then fed into the vulcanizer by valve 137, the water discharging through valve 138. After 30 minutes have elapsed the lever 62 of cam 57 again engages the raised cam surfaces 57a and the valve 137 is closed, while the valve 138 may remain open until the mechanism is again set to zero at the beginning of the next run.

*V. Steam controlling mechanism for re-warming molds.*—The cam 52 has by this time reached the raised cam portion 52d, and the cam 53 a similar cam portion, and swung the respective levers 62 counter-clockwise to effect opening of steam valve 131. Steam is thus charged into the vulcanizer 20 until a predetermined temperature is reached, after which the levers 62 drop off the raised cam portions and close the valve 131. In this way the tires are warmed to facilitate their removal from the molds. After the closing of the valve 131, the cam 56, by means of cam surface 56b swings its lever 62 counter-clockwise to open the steam blow-off valve 136.

*VI. Air shut-off mechanism.*—The cam 55 controlling the air supply has by this time revolved to such an extent that its lever 62 drops off the cam surface 55a and causes the air valve 80 (Fig. 1) to close. At about the same time the lever 62 cooperating with cam 59 (Fig. 25) drops off the cam surface 59a and by means of the direct acting valve 73' associated therewith releases the air from valve 139, thus opening the latter and discharging the air from the air bags. The release of compressed air from valve 139 closes the circuit to a green signal lamp 140 by means of a pressure operated switch 141 of any suitable type connected to the valve, the green light indicating the end of the cure.

It will be recalled that the nose 112 of lever 110 (Fig. 15) was in step 107 when the clock 99 was stopped and that in this position the lever 110 causes engagement of contacts 116 and 117. These contacts are in series with the lower hydraulic contact 51 (see Figs. 3 and 4) which is engaged by contact 26 on arm 24 when the water pressure in Bourdon spring 23 is released upon closing valve 22a and discharge of the water from the cylinder 22' at the end of the cure, the circuit including (Fig. 3) the positive power line, conductor 26a, contacts 26, 51, conductors 51a, 51b, contacts 117, 116, conductor 103, motor 98 and conductor 104 connected to the negative line. The clock then rotates at the end of the curing process until the nose 112 rides onto step 108; the spring contacts 116 and 117 and also 118 and 119 are then permitted to separate, thus breaking the circuit to both clocks 99 and 130, which then stop. The shaft 42 stops in advance of its zero position and it is the function of the zero setting mechanism described above to bring the shaft quickly to its zero position before the next cycle of operations begins.

When the water is discharged from the spring 23 and the arm 24 moves into engagement with contact 51 as above described, the lever 45 is moved clockwise, as viewed in Fig. 4, into its original position.

It sometimes happens that the pressure of the water employed to operate the hydraulic ram drops, in which event the air must be discharged from the air bags to prevent injury to the latter and to the tires. This faulty condition has hitherto been indicated by means of a signalling device in the vulcanizing room; upon observing the signal the attendant would immediately open the air bag discharge valve.

We accomplish such result reliably and automatically by means of the mechanism shown in Figs. 13 and 14 which may be used in place of or together with the cam 59 and its associated elements. A cam 59' is mounted on the cam shaft 42 and is engaged by a lever 62 upon which is mounted a lever 67a similar to levers 62 and 67' of Fig. 8. The lever 67a is provided with a lateral extension 142 upon which is mounted an adjustable screw 143. A Bourdon spring 144 is clamped at 145 and is connected to the same hydraulic line as spring 23 (Fig. 4) through a connection 146. To the inner end of the spring 144 is connected an arm 147 whose free end underlies the screw 143. The latter is so adjusted as to be out of contact with arm 147 when the water in spring 144 is at full pressure.

When the hydraulic pressure in spring 144 drops, the inner end of the latter moves counter-clockwise and raises arm 147 against screw 143 and rocks lever 67a, whereupon screw 71 at the other end of the lever is moved away from valve pin 72 of control valve 73. The latter is reverse acting (Fig. 11), and upon dropping of its pin 72 causes discharge of the air from the diaphragm valve 139 (Fig. 1), thereby permitting the latter to open and release the air from the air bags. If the pressure in the hydraulic line does not drop, the Bourdon spring does not affect lever 67a and at the end of the cure the lever 62 drops from the higher to the lower part of the cam and lever 67a opens control valve 73 which in turn opens air discharge valve 139. The valve 73 may control, simultaneously with valve 139, a reversely acting diaphragm valve 139' located in the air line 21, the valve 139' closing when the air is discharged therefrom and opening when compressed air is charged thereinto, so as to close when valve 139 opens and vice versa.

As can be seen from Figs. 2, 8, 10, 12, and 13, the direct acting valves 73' and reverse acting valves 73 are mounted upon the beam 65 in front of the cams 52 to 59. The beam is provided with a chamber 148 which serves as a manifold for supplying compressed air at about 15 lbs. gage pressure to the various diaphragm valves operated by the control valves 73, 73', said manifold being in communication with the bores 76, 76' of the valves 73, 73'. The chamber 148 is charged with compressed air through a pipe 149 connected to a gage 150. The beam is separately bored, as indicated at 151, in Fig. 13, to establish communication through pipes 152 between the channels 77, 77' of valves 73, 73' and the respective diaphragm valves controlled thereby. Each pipe 152 is connected to a gage 153 to indicate the operation of the respective diaphragm valve. The whole mechanism may be housed within a closed casing 152' only part of which is shown in Fig. 2.

In order to enable the cams 53 to 59 to be adjusted to different time schedules, the same are constructed as indicated in Figs. 20 to 27. Referring more particularly to Figs. 26 and 27, which show an enlarged view of cam 52, it will be seen that the cam is composed of a disk 154 which is circular for the greater part of its periphery and is provided with a raised or projecting circular segment 154a. A second disk 155 constructed similarly to the disk 154 is provided with a raised circular segment 155a of the same radius as the segment 154a so as to be complementary thereto. These two segments combine to form the circular cam surface 52b of Fig. 8. A third disk 156 carries the projecting cam 52d. A cam plate 157 is hinged eccentrically at 158 to the disk 154 and is provided with the cam surface 52a. The disks are adapted to be mounted upon a sleeve 158 which enters slots 154', 155', 156' in the disks. The latter and also the plate 157 are clamped against a collar 159 on the sleeve by means of a washer 160 and nut 161. It will be obvious that by adjusting the disks relatively to each other the length of the raised portion of the cam, and hence the period of time during which a valve is held open or closed, as determined by the operation of the lever 62 cooperating with the cam, can be varied; in the case of cam 52, the moment of feeding steam to the vulcanizer to warm the molds after the same have been cooled by water may be predetermined by adjusting disk 156 carrying projection 52d; while the plate 157 can be adjusted to predetermine the rate at which the temperature rises in the vulcanizer. A clamp 162 (Fig. 2) may be employed to hold the shaft 42 against rotation while the cams are set to a predetermined time schedule.

While we have shown the timing cams as composed of more or less circular disks, it is obvious that in certain instances they may be composed of sectors having complementary cam surfaces.

As stated above, the graduated dial 60 serves to indicate the zero position of the cam shaft 42. The dial and its pointer also aid in properly positioning the cams 52 to 59 relatively to each other on the shaft. It will be obvious that the dial will also indicate the stage which the vulcanization treatment has reached at any moment. For greater convenience, the dial may be mounted outside the casing and geared to the shaft 42 in any suitable manner.

If desired, the zero setting mechanism may be dispensed with and the mechanism set to zero by hand to start the cure.

When the hydraulic pressure is lower than that for which the cycle control mechanism is set, but is sufficient to operate the ram, or when it is desired to start the cure before the hydraulic pressure has reached its full value, a parallel circuit controlled by a push button may be provided to set the cam shaft 42 into motion.

The switch 128 which operates to set the clock 99 again into motion after it has stoped at a "dead" spot, may be replaced by a lever or button on the cam disk 106 which can then be directly rotated to bring the lever 110 into position to make and break the proper contacts.

Instead of the more or less exposed contacts shown in the drawing, the well-known glass-enclosed mercury contacts may be employed. Such glass enclosed contacts will have to be used when hot water or steam under pressure is employed to inflate the bags in the tires instead of air as described hereinabove, as water and steam would short-circuit the contacts 86, 87 and 88 of the differential mechanism shown in Figs. 18 and 19. A satisfactory pressure differential switch device to replace that shown in Figs. 18 and 19 is shown in Figs. 29, 30 and 31. This device includes two Bourdon springs 163 and 164 whose outer ends are fixed upon brackets 165 attached to a fixed part of the controller casing, the springs being arranged in opposed relation as shown in Fig. 29. To the inner ends of the springs are fixed arms 166 and 167 whose inner ends are bifurcated to receive pins 168 mounted upon a floating member 169. This floating member is quadrangular, as shown in the drawings, the two pins 168 and a second set of pins 170 being located at the apices thereof. The pins 170 move in slots 171 of a plate 172 which is hingedly mounted upon a bolt 173. It will be understood that the inner ends of the Bourdon springs 163, 164 are free to pivot about the centers of such springs as the latter expand and contract and that the arms 167 are thereby swung about such pivots as the pressure in the springs increases or decreases.

A bar 174 is pivoted at 175 upon the plate 172 and carries a clip 176 which is adapted to receive a mercury switch 177 composed of a glass tube within which a body of mercury 86 floats. The bar 174 is held in fixed position upon the plate 172 by means of a screw 175' which engages in an elongated curved slot concentric with the pivot 175. Projecting into the tube at the opposite ends thereof are two contacts 87 and 88 which are adapted to become immersed in the mercury 86 as the tube is tilted to the right or to the left. The body of mercury 86 and the contacts 87 and 88 correspond in their function and operation to the contacts 86, 87 and 88 shown in Figs. 17 and 18, and are connected respectively to the terminals 86', 87' and 88' mounted upon a fixed support.

The Bourdon spring 163 is connected to the water or steam line in a manner similar to the connection of the interior of the casing 82 to the air supply line as shown in Figs. 1 and 18;

while the spring 164 is connected to the air bags in a manner similar to the connection of the Bourdon spring 83 as shown in Figs. 1 and 18.

The operation of the differential water or steam pressure switch just described is as follows: When the pressure in the Bourdon springs 163 and 164 is the same, their respective arms 166 and 167 will be symmetrically positioned so that the floating member 169 will have the position shown in Fig. 29. The plate 172 will consequently be vertical and the body of mercury will be out of contact with 88 but will be in contact with 87. If, however, a leak exists in the tire bags, the spring 164 will be contracted relatively to spring 163 and the arm 167 will swing downwardly relatively to the arm 166. This will cause the floating member 169 to tilt clockwise and thus cause the plate 172 to tilt in the same direction. The body of mercury 86 will then move to the right, and if the leak exceeds a predetermined rate, the mercury will touch the contact 88. The controlling mechanism operated when the circuits are closed through contacts 86 and 88 is the same as described in connection with Figs. 18 and 19.

In order to vary the differential between the springs 163 and 164 necessary to make contact between 86 and 88 the bar 174, upon loosening of the screw 175', may be tilted about its pivot 175 by means of an eccentric 178, after which the screw 175' is again tightened.

Where in the claims we employ the word "air" in connection with the tire bags, and with the valves, conduits, etc., associated with the leak-detecting mechanism, the same is to be understood to include hot water and steam as equivalents.

Parts of our invention may be used without others, and various other modifications may be resorted to within the scope of the appended claims without departing from the spirit thereof.

We claim:

1. The combination with a processing apparatus, of a plurality of conduits arranged to charge one or more fluids thereinto and to discharge the same therefrom, valves in said conduits, timing mechanism associated with said valves and adapted to open and close the same at predetermined instants in accordance with a predetermined cycle of operations in said apparatus, means such as a valve operable to initiate said cycle in said apparatus, and means automatically operative to set said timing mechanism to zero after said cycle of operations has begun.

2. The combination with a processing apparatus, of a plurality of conduits arranged to charge one or more fluids thereinto and to discharge the same therefrom, valves in said conduits, timing mechanism associated with said valves and adapted to open and close the same at predetermined instants in accordance with a predetermined cycle of operations in said apparatus, and means automatically operative when a predetermined condition in said apparatus is attained to set said timing mechanism to zero.

3. The combination with a processing apparatus, of a plurality of conduits arranged to charge one or more fluids thereinto, including a fluid under pressure, and to discharge the same therefrom, valves in said conduits, timing mechanism associated with said valves and adapted to open and close the same at predetermined instants in accordance with a predetermined cycle of operations in said apparatus, and means controlled by the pressure of said fluid under pressure for automatically setting said timing mechanism to zero.

4. The combination with a processing apparatus, of a plurality of conduits arranged to charge one or more fluids thereinto and to discharge the same therefrom, valves in said conduits, timing mechanism associated with said valves and adapted to open and close the same at predetermined instants in accordance with a predetermined cycle of operations in said apparatus, said mechanism including a shaft, a plurality of timing cams on said shaft, and levers cooperating with said cams, means such as a valve operable to initiate said cycle in said apparatus and means for quickly setting said timing mechanism automatically to zero after said cycle of operations has begun.

5. The combination with a processing apparatus, of a plurality of conduits arranged to charge one or more fluids thereinto and to discharge the same therefrom, valve in said conduits, timing mechanism associated with said valves and adapted to open and close the same at predetermined instants in accordance with a predetermined cycle of operations in said apparatus, said mechanism including a shaft, a plurality of timing cams on said shaft, and levers cooperating with said cams, and means for quickly setting said timing mechanism to zero when said cycle of operations is begun, said means including an electric motor, and an electromagnetically controlled clutch between said shaft and said motor.

6. The combination with a processing apparatus, of a plurality of conduits arranged to charge one or more fluids thereinto and to discharge the same therefrom, valves in said conduits, timing mechanism associated with said valves and adapted to open and close the same at predetermined instants in accordance with a predetermined cycle of operations in said apparatus, said mechanism including a shaft, a plurality of timing cams on said shaft, and levers cooperating with said cams, and means for quickly setting said timing mechanism to zero when said cycle of operations is begun, said means including an electric motor, an electromagnetically controlled clutch between said shaft and said motor, a switch controlling the electric circuits to said motor and clutch, and means controlled by said shaft and operative to open said switch when said zero position is reached.

7. The combination with a processing apparatus, of a plurality of fluid circuits operatively associated with said apparatus, controlling devices in said circuits to open and close the same, timing mechanism for controlling the operation of said devices including a rotatable shaft, an electric motor, an electromagnetically controlled clutch between said motor and said shaft, a switch for closing the electric circuits to said motor and clutch, and means for opening said switch when the shaft has reached a predetermined position.

8. The combination with a processing apparatus, of a plurality of fluid circuits operatively associated with said apparatus, controlling devices in said circuits to open and close the same, timing mechanism for controlling the operation of said devices including a rotatable shaft, an electric motor, an electromagnetically controlled clutch between said motor and said shaft, a switch for closing the electric circuits to said motor and clutch, and means for opening said switch when said shaft has reached a predetermined position, said means including an arm on said shaft engageable with said switch.

9. The combination with a processing apparatus, of a conduit for conducting a fluid at high temperature or pressure thereto, a diaphragm valve in said conduit, timing mechanism associated with said valve to control the opening and closing thereof at predetermined instants including a rotatable shaft, a timing cam thereon, a lever pivoted intermediate its ends and controlled by said cam, a second lever pivoted intermediate its ends to said first-mentioned lever, a control valve operated by said second lever and connected to said diaphragm valve to charge air into the latter or to discharge the same therefrom, said second lever being movable with and also independently of said first lever, and mechanism movable in response to variations in temperature or pressure in said apparatus and effective upon said second lever to regulate said control valve independently of said cam to maintain the temperature or pressure in said apparatus along a predetermined curve.

10. The combination with a processing apparatus, of a conduit for conducting a fluid at high temperature or pressure thereto, a duplex diaphragm valve in said conduit, timing mechanism asociated with said valve to control the opening and closing thereof at predetermined instants including a rotatable shaft, a pair of similar timing cams thereon, a movable member controlled by each of said cams, a lever pivoted to each of said members, a control valve operated by each lever and connected to said duplex valve to charge air into the latter or to discharge the same therefrom, said levers being movable with and also independently of said members, and mechanism movable in response to variations in temperature or pressure in said apparatus and associated with each lever and effective thereon to regulate said control valves independently of said cams to maintain the temperature or pressure in said apparatus along a predetermined curve.

11. The combination with a vulcanizing retort adapted to have a plurality of tire molds stacked therein and provided with a hydraulic ram for supporting said molds, of a plurality of conduits arranged to charge a plurality of different fluids into said retort and to discharge the same therefrom, valves in said conduits, timing mechanism for controlling the opening and closing of said valves at predetermined instants including a rotatable shaft, a conduit for conducting a fluid under pressure to said ram to operate the same, and means controlled by said fluid under pressure for quickly setting said shaft to a predetermined zero position.

12. The combination with a vulcanizing retort adapted to have a plurality of tire molds stacked therein and provided with a hydraulic ram for supporting said molds, of a plurality of conduits arranged to charge a plurality of different fluids into said retort and to discharge the same therefrom, valves in said conduits, timing mechanism for controlling the opening and closing of said valves at predetermined instants including a rotatable shaft, a conduit for conducting a fluid under pressure to said ram to operate the same, and zero setting mechanism for quickly rotating said shaft to a predetermined position including a motor, a differential pressure switch controlling said motor and operated by said fluid under pressure, and means for stopping the shaft at said predetermined position.

13. The combination with a vulcanizing retort adapted to have a plurality of tire molds stacked therein and provided with a hydraulic ram for supporting said molds, each of said molds adapted to be equipped with an air bag, of conduits arranged to charge air into said bags and to discharge the same therefrom, valves in said conduits, timing mechanism for controlling the opening and closing of said valves at predetermined instants, automatically operating means for detecting a leak in said bags, and an electric circuit controlled by said means.

14. The combination with a vulcanizing retort adapted to have a plurality of tire molds stacked therein, each of said molds adapted to be equipped with an air bag, of conduits arranged to charge air into said bags and to discharge the same therefrom, valves in said conduits, timing mechanism for controlling the opening and closing of said valves at predetermined instants, said mechanism operating to open the air charging valve at the beginning of the cycle of operations, clock mechanism operatively associated with said charging valve, electromagnetic means controlled by said clock mechanism and operative to close said valve at a predetermined instant after the bags have been filled, and a differential pressure mechanism connected to the air-charging conduit in advance and to the rear of said valve, and operable upon fall of pressure in said air bags below the pressure in the air conduit to stop said clock mechanism and keep said valve closed.

15. The combination with a vulcanizing retort adapted to have a plurality of tire molds stacked therein, each of said molds adapted to be equipped with an air bag, of conduits arranged to charge air into said bags and to discharge the same therefrom, valves in said conduits, timing mechanism for controlling the opening and closing of said valves at predetermined instants, said mechanism operating to open the charging valve at the beginning of the cycle of operations, clock mechanism operatively associated with said charging valve to close the same at a predetermined instant after the bags have been filled, a differential pressure mechanism connected to the air-charging conduit in advance and to the rear of said charging valve, and a signalling circuit operated by said differential mechanism when a leak in said air bags exceeds a fixed amount during an interval determined by said clock.

16. The combination with a vulcanizing retort adapted to have a plurality of tire molds stacked therein, each of said molds adapted to be equipped with an air bag, of conduits arranged to charge air into said bags and to discharge the same therefrom, valves in said conduits, timing mechanism for controlling the opening and closing of said valves at predetermined instants, said mechanism operating to open the air-charging valve at the beginning of the cycle of operations, clock mechanism operatively associated with said charging valve to close the same at a predetermined instant after the bags have been filled, and a differential pressure mechanism connected to the air-charging conduit in advance and to the rear of said charging valve, and operable to stop said clock mechanism upon fall of pressure in said bags below the pressure in the air conduit at a rate in excess of a predetermined maximum.

17. The combination with a vulcanizing retort adapted to have a plurality of tire molds stacked therein, each of said molds adapted to be equipped with an air bag, of conduits arranged to charge air into said bags and to discharge the same therefrom, valves in said conduits, timing mechanism for controlling the opening and closing of said valves at predetermined instants, said mechanism operative upon the opening of said valve to set said shaft quickly to zero, said timing mechanism in its zero position operating to open the air valve, differential pressure mechanism connected to the air conduit in advance and to the rear of said air valve, a clock associated with said differential pressure mechanism and with said air valve, said mechanism operating to set said clock into operation when said valve is open, means controlled by said clock for closing said valve after the lapse of a predetermined interval, means whereby said clock is stopped by said differential mechanism upon fall of pressure in said bags below the pressure in the air conduit at a rate in excess of a predetermined maximum, means adapted to be operated after the clock has been stopped to cause said clock to resume operating after the leak in the bags has been repaired, said clock effecting opening of said air valve, a motor for operating said shaft, and means controlled by said clock for starting said motor.

23. The combination with a vulcanizing retort adapted to have a plurality of molds stacked therein, each of said molds adapted to be equipped with an air bag, and a hydraulic ram for supporting said molds, of a plurality of conduits arranged to charge a plurality of fluid media to said retort and to discharge the same therefrom and including an air conduit for charging air under pressure to said bags and a water conduit for charging water under pressure to said hydraulic ram, valves in said conduits, timing mechanism associated with said valves for controlling the opening and closing thereof at predetermined instants and including a shaft and a plurality of timing cams mounted thereon, a manually operated valve in the water conduit, hydraulically operated means connected to said water conduit to the rear of said water valve and operative upon the opening of said valve to set said shaft quickly to zero, said timing mechanism in its zero position operating to open the air valve, differential pressure operated mechanism connected to the air conduit in advance and to the rear of said air valve, a clock associated with said differential mechanism and with said air valve, said mechanism operating to set said clock into operation when said air valve is open, means controlled by said clock for closing said air valve after the lapse of a predetermined interval, a means whereby said clock is stopped by said differential mechanism upon fall of pressure in said bags below the pressure in the air conduit at a rate in excess of a predetermined maximum, means adapted to be operated after the clock has been stopped to cause said clock to resume operating after the leak in the bags has been repaired, said clock effecting opening of said air valve, a motor for operating said shaft, means controlled by said clock for starting said motor, and pressure operated mechanism connected to the water conduit and associated with the air conduits and operative upon fall in pressure in the water conduit to close the air charging conduit and open the air discharging conduit to release the air from the air bags.

24. An adjustable timing cam comprising a shaft, a plurality of coaxially mounted cam sections on said shaft, said sections being movable on said shaft to vary the relationship between said cam surfaces, and means for simultaneously fixing said cam sections on said shaft.

25. An adjustable cam comprising two cam sections having cam surfaces of different heights, and an adjustable eccentrically mounted cam arranged to provide a variable transition surface from one cam surface to the other.

26. The combination with a processing apparatus, of a plurality of conduits arranged to charge one or more fluids thereinto and to discharge the same therefrom, valves in said conduits, timing mechanism associated with said valves and adapted to open and close the same at predetermined instants in accordance with a predetermined cycle of operations in said apparatus, said mechanism including a shaft, a plurality of timing cams on said shaft, and levers cooperating with said cams, and means for quickly setting said timing mechanism to zero when said cycle of operations is begun, said means including an electric motor, a switch controlling the circuit of said motor, and means for opening said switch when the cam shaft reaches its zero position.

27. The combination with a processing apparatus, of a conduit for conducting a fluid at high temperature or pressure thereto, a diaphragm valve in said conduit, timing mechanism associated with said valve to control the opening and closing thereof at predetermined instants, including a rotatable shaft, a timing cam thereon, a member engaging said cam to be controlled thereby, a lever pivotally mounted upon said member so as to be movable therewith under the control of the cam but capable of being oscillated independently of said member, an air control valve operated by said lever and connected to said diaphragm valve to charge air into the latter or to discharge the air therefrom, and mechanism for moving said lever to the limit of its movement in one direction and thereby maintaining said control valve in a limiting condition of regulation independently of said cam.

28. The combination with a vulcanizing retort adapted to have a plurality of tire molds stacked therein, each of said molds adapted to be equipped with an air bag, of a conduit arranged to charge air into said bags, a valve in said conduit, timing mechanism for controlling the opening and closing of said valve at predetermined instants, automatically operating mechanism for detecting a leak in said bags, and means controlled by said mechanism for giving a sensible indication of a leaky condition in said bags.

29. Apparatus for testing for a leak of a fluid under pressure, comprising a conduit for charging a fluid under elevated pressure into a closed space, a valve in said conduit adapted to be closed for a predetermined interval of time during which the degree of leakage to the rear of the valve is to be determined, differential pressure mechanism connected to said conduit in advance and to the rear of said valve, and means controlled by said differential mechanism for giving a sensible indication when a leak to the rear of the valve exceeds a predetermined rate.

30. The combination with a vulcanizing retort adapted to have a plurality of tire molds stacked therein and provided with a hydraulic ram for supporting said molds, each of said molds adapted to be equipped with an air bag, of conduits arranged to charge air into said bags and steam into said vulcanizer and to discharge said air and steam, valves in said conduits, timing mechanism for controlling the opening and closing of said valves at predetermined instants including a shaft and a plurality of timing cams thereon, a conduit for conducting water under pressure to the ram of the vulcanizer, mechanism controlled by the pressure of said water for quickly bringing said operating to open the charging valve at the beginning of the cycle of operations, clock mechanism operatively associated with said charging valve to close the same at a predetermined instant after the bags have been filled, and a differential pressure mechanism connected to the air-charging conduit in advance and to the rear of said charging valve, and operable to stop said clock mechanism upon fall of pressure in said bags below the pressure in the air conduit, at a rate in excess of a predetermined maximum, and means for causing said clock to continue operating after the leak in the air bags has been repaired.

18. The combination with a vulcanizing retort adapted to have a plurality of tire molds stacked therein, each of said molds adapted to be equipped with an air bag, of conduits arranged to charge air into said bags and to discharge the same therefrom, valves in said conduits, timing mechanism for controlling the opening and closing of said valves at predetermined instants, said mechanism operating to open the air-charging valve at the beginning of the cycle of operations, clock mechanism operatively associated with said charging valve to close the same at a predetermined instant after the bags have been filled, a differential pressure mechanism connected to the air-charging conduit in advance and to the rear of said charging valve, and operable to stop said clock mechanism upon fall of pressure in said bags below the pressure in the air conduit at a rate in excess of a predetermined maximum, and means for causing said clock to continue operating after the leak in the air bags has been repaired, said clock effecting opening of said air valve at a predetermined instant to refill said air bags.

19. The combination with a vulcanizing retort adapted to have a plurality of tire molds stacked therein, each of said molds adapted to be equipped with an air bag, of a plurality of conduits arranged to charge a plurality of fluid media to said retort, including air into said bags, and to discharge said media from said retort, valves in said conduits, timing mechanism associated with said valves to open and close the same at predetermined instants, said mechanism including a shaft, and a plurality of timing cams thereon, clock mechanism associated with the valve in the air-charging conduit and operative, after the same has been opened to fill the air bags, to close the same after a predetermined interval, differential pressure mechanism connected to the air conduit in advance and to the rear of such valve and operative to stop said clock mechanism upon fall of pressure in said bags below the pressure in the air conduit at a rate in excess of a predetermined maximum, means adapted to be manually operated after the clock has been stopped to cause the latter to resume operating after the leak in the air bags has been repaired, said clock thereupon effecting opening of said air valve, a motor for operating said shaft, and means controlled by said clock for starting said motor.

20. The combination with a vulcanizing retort adapted to have a plurality of tire molds stacked therein, each of said molds adapted to be equipped with an air bag, of a plurality of conduits arranged to charge a plurality of fluid media to said retort, including air into said bags, and to discharge said media from said retort, valves in said conduits, timing mechanism associated with said valves to open and close the same at predetermined instants, said mechanism including a shaft and a plurality of timing cams thereon, clock mechanism associated with the valve in the air-charging conduit and operative, after the same has been opened to fill the air bags, to close the same after a predetermined interval, a motor for operating said clock mechanism, differential pressure mechanism connected to the air-charging conduit in advance and to the rear of said valve and operative to stop said clock mechanism upon fall of pressure in said bags below the pressure in the air conduit at a rate in excess of a predetermined maximum, means adapted to be operated after the clock has been stopped to cause the latter to resume operating after the leak in the air bags has been repaired, said clock thereupon effecting opening of said air valve, a motor for operating said shaft, means controlled by said clock for starting said shaft motor, and means operated by said clock for stopping the clock motor when said shaft motor is started.

21. The combination with a vulcanizing retort adapted to have plurality of molds stacked therein, each of said molds adapted to be equipped with an air bag, and a hydraulic ram for supporting said molds, of a plurality of conduits arranged to charge a plurality of fluid media to said retort and to discharge the same therefrom and including an air conduit for charging air under pressure to said bags and a water conduit for charging water under pressure to said hydraulic ram, valves in said conduits, timing mechanism associated with said valves for controlling the opening and closing thereof at predetermined instants and including a shaft and a plurality of timing cams mounted thereon, a manually operated valve in the water conduit, means operative upon the opening of said water valve to set said shaft quickly to zero, said timing mechanism in its zero position operating to open the air valve, differential pressure mechanism connected to the air conduit in advance and to the rear of said air valve, a clock associated with said differential mechanism and with said air valve, said mechanism operating to set said clock into operation when said valve is open, means controlled by said clock for closing said valve after the lapse of a predetermined interval, means whereby said clock is stopped by said differential mechanism upon fall of pressure in said bags below the pressure in the air conduit at a rate in excess of a predetermined maximum, means adapted to be operated after the clock has been stopped to cause said clock to resume operating after the leak in the bags has been repaired, said clock effecting opening of said air valve, a motor for operating said shaft, and means controlled by said clock for starting said motor to time the charge and discharge of the other media into and from said retort.

22. The combination with a vulcanizing retort adapted to have a plurality of molds stacked therein, each of said molds adapted to be equipped with an air bag, and a hydraulic ram for supporting said molds, of a plurality of conduits arranged to charge a plurality of fluid media to said retort and to discharge the same therefrom and including an air conduit for charging air under pressure to said bags and a water conduit for charging water under pressure to said hydraulic ram, valves in said conduits, timing mechanism associated with said valves for controlling the opening and closing thereof at predetermined instants and including a shaft and a plurality of timing cams mounted thereon, a manually operated valve in the water conduit, hydraulically operated means connected to said water conduit to the rear of said water valve and shaft to zero position, means for stopping said shaft in the zero position, said timing mechanism adapted, in its zero position, to open the air valve, means for closing the air valve for a predetermined time interval after the air bags have been filled, means for indicating the rate of loss of air from the bags, means for re-opening the air valve, a clock for driving said shaft, and means for starting said clock automatically after said air valve has been re-opened.

31. The combination with a processing apparatus, of a conduit for feeding a fluid to said apparatus, a second conduit for feeding a fluid under pressure to said apparatus, a fluid pressure-operated valve in the first conduit, mechanism for automatically controlling said valve including a cam, means for rotating the same, a member engaging said cam to be controlled thereby, a lever pivotally mounted upon said member so as to be movable with and also independently of the latter, a conduit for conducting a fluid under pressure to said valve, a control valve in said last-mentioned conduit arranged to be regulated by said lever, and a pressure responsive member connected with the second-mentioned conduit and associated with said lever to cause adjustment of the control valve in a manner to effect closing of said valve when the pressure in such conduit falls below a predetermined minimum.

32. Apparatus for testing for a leak of a fluid under pressure, comprising a conduit for charging a fluid under elevated pressure into a closed space, a valve in said conduit adapted to be closed for a predetermined interval of time during which the degree of leakage to the rear of the valve is to be determined, a pair of pressure responsive devices connected to said conduit in advance and to the rear of said valve, a tiltable member controlled by both of said devices and adapted to be tilted when the pressure in said devices are unequal, an electric circuit, and a mercury switch mounted on said member and controlling said circuit.

FRANK J. BAST.
LAWRENCE C. IRWIN.